United States Patent [19]

Kondo et al.

[11] Patent Number: 5,406,560
[45] Date of Patent: Apr. 11, 1995

[54] SPEECH PACKET COMMUNICATION SYSTEM

[75] Inventors: Kazuhiro Kondo, Fuchu; Masashi Ohno, Kodaira, both of Japan

[73] Assignee: Hitachi, Ltd., Tokyo, Japan

[21] Appl. No.: 740,133

[22] Filed: Aug. 5, 1991

Related U.S. Application Data

[63] Continuation-in-part of Ser. No. 439,805, Nov. 21, 1989, Pat. No. 5,130,985.

[30] Foreign Application Priority Data

Aug. 13, 1990 [JP] Japan ............................... 2-211719

[51] Int. Cl.⁶ ............................................. H04J 3/24
[52] U.S. Cl. .............................. 370/94.1; 370/85.6; 340/825.5; 375/27
[58] Field of Search ............... 370/94.1, 80, 85.6; 340/825.5, 825.51; 381/36; 375/27

[56] References Cited

U.S. PATENT DOCUMENTS 4,993,022  2/1991  Kondo et al. .................... 370/85.6

OTHER PUBLICATIONS

AT&T Technical Journal vol.65, No.5, 1986–9.10, pp. 12–22.
IEEE Transactions On Communications, vol.COM–28, No.7, Jul. 1980, pp. 1040–1046.
"Variable Rate Embedded ADPCM with Perceptually Appropriate Criteria", A–4, 1988, The Institute of Electronics, Information and Communication Engineers.
Proc. Globecom '84(1984) "Overview of the ADPCM Coding Algorithm", pp.23.1-1–23.1.4.
"Overview of CCITT Embedded ADPCM Algorithms", pp.1014–1018, Apr. 1990.

*Primary Examiner*—Stephen Chin
*Assistant Examiner*—T. Ghebretinsae
*Attorney, Agent, or Firm*—Antonelli, Terry, Stout & Kraus

[57] ABSTRACT

In a speech packet transmission system, a transmitter (speech terminal) first linearly predicts a speech signal input at a predetermined sample period from the input signal in the past and outputs the difference between the input speech signal and the prediction signal. A prediction coefficient used for linear prediction at this time is adapted with an output differential coded value at each predetermined sample period such that the prediction value is as close as possible to the value of the input waveform. The difference between the input speech signal and the prediction signal is converted to a differential code. A packet is prepared from a plurality of differential codes obtained during a frame period concerned and transmitted to a transmission line. A bit accuracy indicative of the differential code and a bit accuracy indicative of the differential coded value used for adaptation of the prediction coefficient are changed depending on the nature or property of the input speech signal.

8 Claims, 7 Drawing Sheets

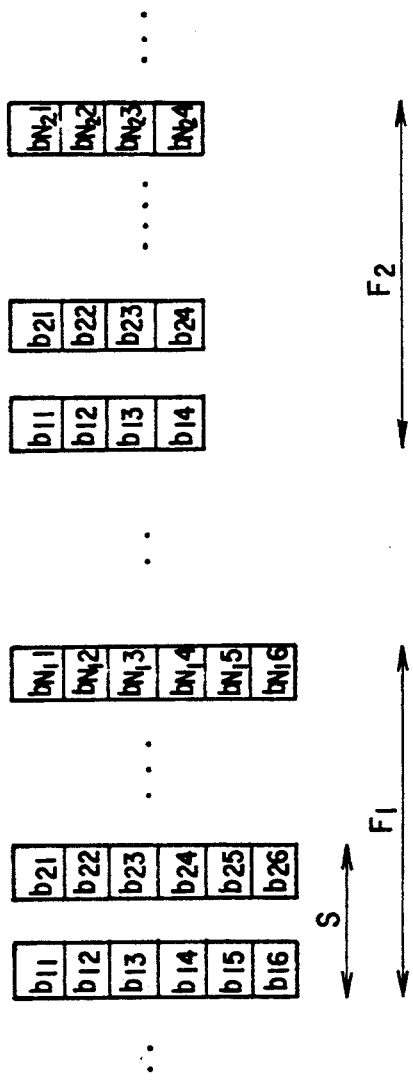

FIG. 5
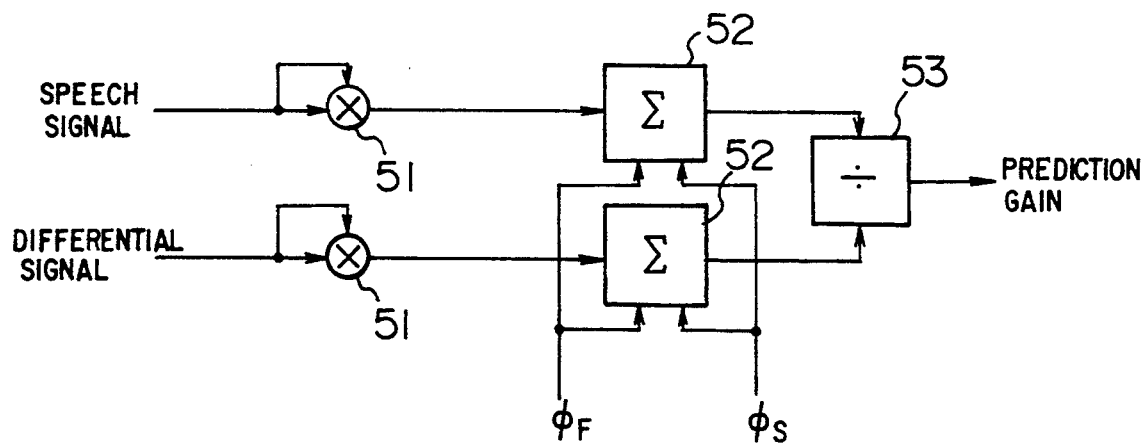
FIG. 6A
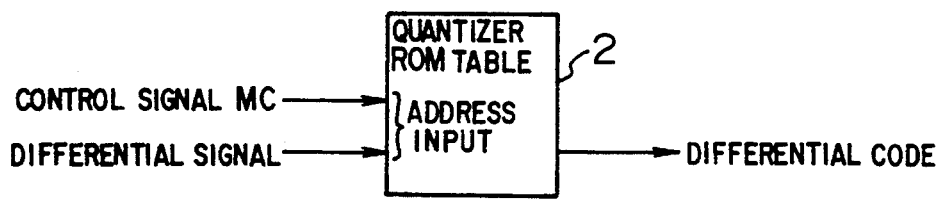
FIG. 6B
| ADDRESS INPUT | | OUTUT (DIFFERENTIAL CODE) |
|---|---|---|
| MC | DIFFERENTIAL SIGNAL | |
| 0 | [ 0, +∞] | 1 |
| 0 | [-∞, 0 ] | -2 |
| 1 | [ 4, +∞] | 1 |
| 1 | [ 0, 4 ] | 0 |
| 1 | [ -3, 0 ] | -1 |
| 1 | [-∞, -3 ] | -2 |

FIG. 6C
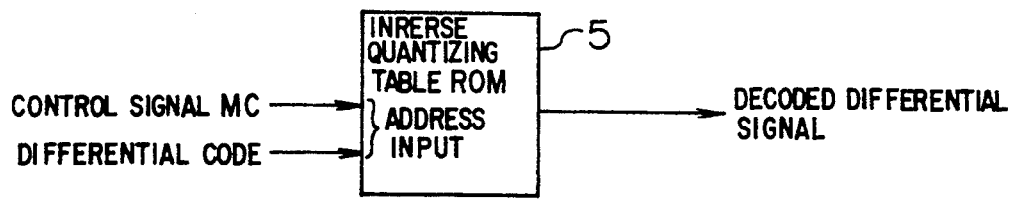
FIG. 6D
| ADDRESS INPUT | | OUTPUT (DECODED DIFFERENTIAL SIGNAL) |
|---|---|---|
| MC | DIFFERENTIAL CODE | |
| 0 | 1 | 10 |
| 0 | 0 | 10 |
| 0 | -1 | -10 |
| 0 | -2 | -10 |
| 1 | 1 | 10 |
| 1 | 0 | 2 |
| 1 | -1 | -2 |
| 1 | -2 | 10 |
FIG. 7A
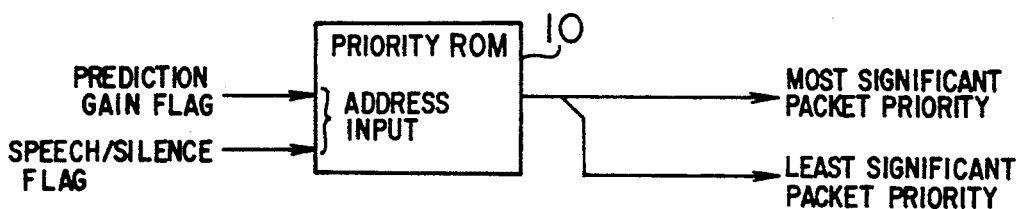
FIG. 7B
| INPUT FLAG | | PRIORITY | |
|---|---|---|---|
| PREDICTION GAIN FLAG | SPEECH/SILENCE FLAG | MOST SIGNIFICANT PACKET | LEAST SIGNIFICANT PACKET |
| 0 | 0 | 1 | — |
| 0 | 1 | 0 | 1 |
| 1 | 0 | 0 | — |
| 1 | 1 | 0 | 1 |

FIG. 8
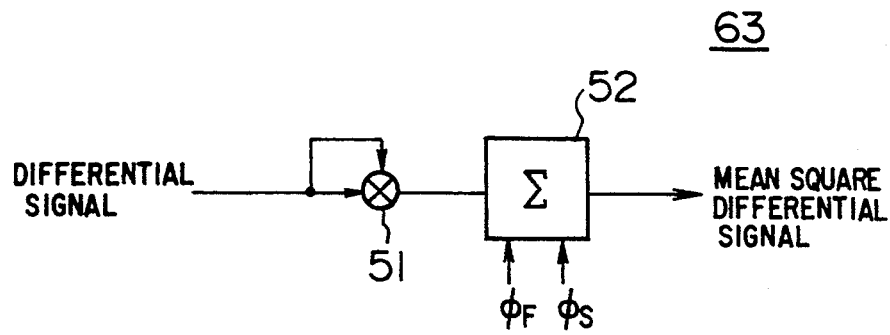
FIG. 9A
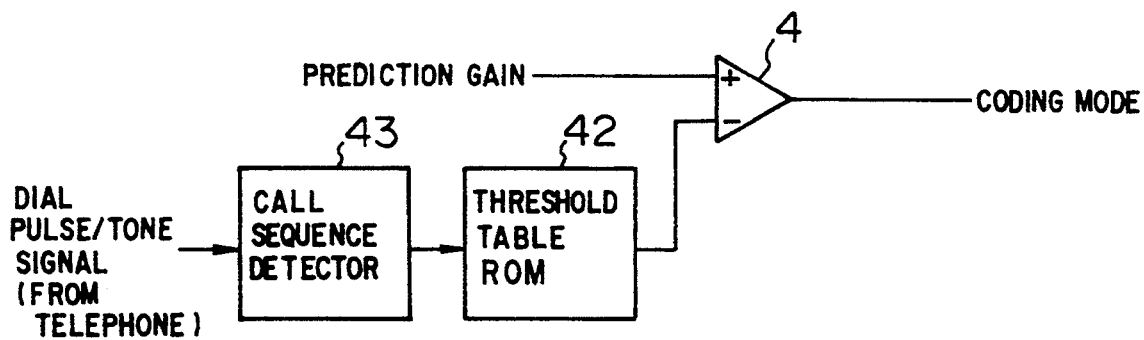
FIG. 9B
| CALL SEQUENCE NUMBER | PREDICTION GAIN THRESHOLD (dB) |
|---|---|
| 1 | 1 |
| 2 | 5 |
| 3 | 10 |
| 4 | 20 |

SPEECH PACKET COMMUNICATION SYSTEM

CROSS-REFERENCE TO RELATED APPLICATION

This is a continuation-in-part of U.S. application Ser. No. 439,805 filed Nov. 21, 1989, U.S. Pat. No. 5,130,985, the disclosure of which is hereby incorpoarted by reference.

BACKGROUND OF THE INVENTION

The present invention relates to speech packet communication systems for communicating encoded speech signals in the form of a packet, and more particularly to such systems in which a plurality of terminals are interconnected via a communication network in which each terminal prepares packets from encoded speech signals and communicates with each other using the packets.

Since, generally, correlation between adjacent samples is high in a speech signal, it is recommendable to linearly predict an input speech signal, to subtract the predicted value from the input signal, and to quantize differentials from which correlation between samples is greatly reduced rather than to directly quantize the input speech signal, because the former provides substantially the same speech quality using a less number of quantization bits than the latter. An encoding system employing this principle is referred to as Differential Pulse Code Modulation (hereinafter referred to as DPCM briefly).

Since correlation between adjacent samples of a speech signal changes with phoneme, it is necessary to adapt a prediction coefficient, used in linear prediction, to the input speech. Generally, a predicted error or the magnitude of the differential is observed and the predicted coefficient is adapted such that the error is reduced. In the decoding end, the differential code or signal output from the transmitter is inverse-quantized or dequantized with a predetermined accuracy and a predicted value is calculated using the result and the output speech signal is obtained using the predicted value. Therefore, both the transmitter and the receiver are able to carry out encoding and decoding on the basis of the same criterion. In that case, even if the predicted coefficient itself is not transmitted actually, both the transmitter and the receiver can determine the same prediction coefficient to thereby use the transmission capacity effectively. This system is known as Backward Adaptive Differential Pulse Code Modulation (hereinafter referred to as ADPCM-b).

In a transit node in a communication network (for example, Asynchronous Transfer Mode (hereinafter referred to as ATM sorely)), certain packets have to be discarded in accordance with the traffic state. Discarding of a packet is determined in accordance with a priority assigned to the packet. Such an operation of a transit node is hereinafter referred to as congestion controlling. In view of such, a first packet is prepared from the most significant differential code bits, which greatly influences the speech quality, of a train of bits of a speech signal inputted and encoded for a predetermined interval of time and the first packet is assigned high priority, while a second packet is prepared from the least significant bits less influencing the speech quality, the second packet being assigned less priority, and the resulting first and second packets are transmitted. Assigning such predetermined priorities to the respective packets serves to provide at least the most significant bits with high probability in the receiver even if a high traffic state occurs in the transit node. If a prediction coefficient used in the ACPCM-b is calculated using only the most significant bits in both the transmitter and receiver, both the transmitter and the receiver will obtain the same prediction coefficient. Such encoding system is known as Embedded Adaptive Differential Pulse Code Modulation (hereinafter referred to as Embedded ADPCM briefly).

The ADPCM is described, for example, in AT & T Technical Journal, Vol. 65, No. 5 (1986-9, 10 pp. 12–22). The Embedded ADPCM is described, for example, in IEEE Transactions On Communications, Vol. COM-28, No. 7 (July, 1980) pp. 1040–1046, "Embedded DPCM for Variable Bit Rate Transmission" or "Variable Rate Embedded ADPCM with Perceptually Appropriate Criteria", the Institute of Electronic Information and Communication Engineers Autumn National Meeting A-4, 1988 or "Overview of CCITT Embedded ADPCM Algorithms", pp. 1014–1018, April 1990.

"Variable Rate Embedded ADPCM with Perceptually Appropriate Criteria" discloses a speech coding system of controlling the coding of a speech signal depending on the nature or property of the input speech signal, comprising the steps of calculating a power value and a prediction gain value of a speech signal input at a predetermined period and changing the number of coding bits with which the input speech signal is efficiently encoded.

SUMMARY OF THE INVENTION

While in the conventional techniques (e.g., Embedded ADPCM) the number of encoded bits which converts an input speech signal in a predetermined period is changed in accordance with the nature or property of the input speech signal, the number of differential code bits used for adaptation of a prediction coefficient is fixed. Differential codes used for the adaption of the prediction coefficient greatly influences the decoded quality while the codes not used for adaptation less influence. Thus, the former is required to be transmitted in preference over the latter.

However, when the differential codes are transmitted in the form of a packet, for example, using an ATM which is a promising candidate for the next generation communication network in Embedded ADPCM, dynamically changing the number of coding bits in one frame period would cause the following problems.

Generally, a packet-like unit of transmission called a fixed length cell is used in an ATM network. The transmission priority can be designated only in units of a cell. Therefore, differential codes used and not used for prediction must be transmitted in separate cells. If the number of code bits in one frame period is not integer times the length of a cell, one of the following two methods must be employed:

(1) The next frame period is awaited, the cell is filled with differential code bits in that period and then transmitted; and (2) Bits each (for example, of "0") indicative of a space are inserted into empty portions of a cell and then the resulting cell is immediately transmitted.

However, in the method (1), the time required for transmitting code bits in one frame period increases and the transmission time varies. At this time, the cell containing the differential codes used for prediction are generated at a fixed rate and the operation of the receiver synchronized with the generation of the cell becomes complicated. The method (2) decreases the efficiency of using a transmission capacity.

It is therefore an object of the present invention to provide an efficient speech packet transmission system which is easily adopted to an ATM network.

It is another object of the present invention to discriminate between the case in which the input speech signal is to be encoded with high quality and the case in which the input speech signal is permitted to be encoded with less quality and to provide an encoding system appropriate for each of the cases.

In order to achieve the above objects, in a speech packet transmission system in one aspect of the present invention, a transmitter (speech terminal) linearly predicts a speech signal input at a predetermined sample period, for example, of 125 μs on the basis of the past input signal and outputs the differential value between the input speech signal and the predicted signal. At this time, the prediction coefficient used for linear prediction is adapted with an output differential code value at each predetermined sample period such that the predicted value takes the closest possible value to the value of the input waveform. The differential value between the input speech signal and the predicted signal is converted to a differential code, a packet is prepared from a plurality of differential codes obtained in a frame interval concerned, and the packet is then sent to a transmission line. The bit accuracy indicative of the differential codes and the bit accuracy of a differential coded value used for adaptation of the prediction coefficient are changed depending on the nature or property of the input speech signal.

The nature or property of the input speech signal signifies, for example, that the input speech signal in a frame period is a speech or silence or that the input speech signal in a frame period is a voiced sound or a non-voiced sound.

In the conventional Embedded ADPCM, the accuracy of the differential codes used for calculation of a prediction coefficient is fixed regardless of the input speech, so that the prediction accuracy is deteriorated depending on the kind of an input speech signal and the amplitude of the differential signal increases. As a result, an error occurring due to quantization of the differential Signal increases and the signal/noise ratio of the decoded speech signal would decrease.

According to the present invention, if the prediction accuracy greatly decreases with a prediction coefficient adpated with a differential code of a predetermined accuracy, the number of differential code bits is increased to perform an adaptive operation of the prediction coefficient for that frame to suppress a decrease in the prediction accuracy, and, simultaneously, a quantization noise is suppressed by increasing the accuracy of differential codes to be transmitted so as to prevent the deterioration in the quality of the speech signal provided by the receiver.

BRIEF DESCRIPTION OF THE DRAWINGS

FIG. 2 schematically illustrates the conversion of an input speech signal to a differential signal;

FIGS. 3A-3D each are a schematic packet structure in a respective coding mode; FIGS. 3A and 3B illustratively showing the most and least significant packets, respectively, obtained when the encoding mode is "0"; FIGS. 3C and 3D illustratively showing the most and least significant packets, respectively, obtained when the coding mode is "1";

FIG. 5 is a block diagram of a prediction gain estimator in the transmitter of the speech communication system to which the present invention is applied;

FIGS. 6A and 6B are a block diagram of a quantizer of a transmitter of the communication system, and a conversion characteristic of the quantizer, respectively;

FIGS. 6C and 6D show an inverse quantizer of a transmitter of the communication system, and a conversion characteristic of the inverse quantizer, respectively;

FIGS. 7A and 7B are block diagrams of a priority assignment unit of the transmitter of the communication system, and a conversion characteristic of the priority assignment unit, respectively;

FIG. 8 is a block diagram of a differential signal mean square estimator of the transmitter of the communication system;

FIGS. 9A and 9B are a block diagram of a coding mode estimator of a transmitter in a third embodiment of the communication system, and its threshold ROM characteristic, respectively.

DESCRIPTION OF THE PREFERRED EMBODIMENTS

Figure 1:
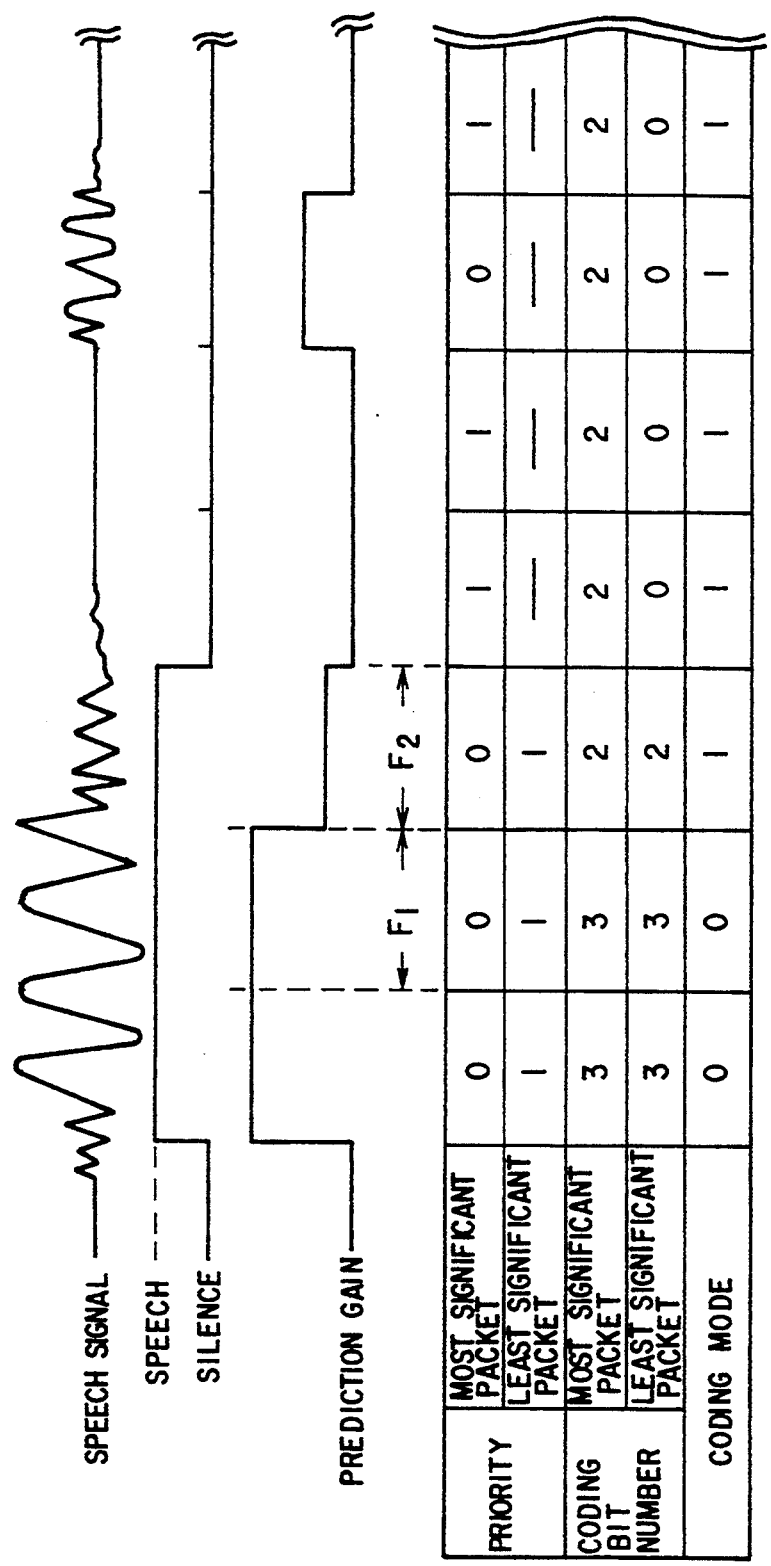
FIG. 1 illustrates the relationship in correspondence between a speech signal inputted to a transmitter (speech terminal) of a speech transmission system to which the present invention is applied, priorities of transmitted packets and coding modes.

FIG. 1 shows the relationship between a speech signal input to a transmitter, the priority of transmitted packets, and a differential coding mode in a speech transmission system to which the present invention is applied.

A speech signal input at a predetermined sample period S, for example, of 125 μs is converted to a differential code, set in a packet at each predetermined frame period F, for example, of 15 ms and the resulting packet is transmitted through a transmission line to a receiver. At this time, the most and least significant bits of the differential code are set in the corresponding separate packets, assigned corresponding predetermined priorities and transmitted to the receiver.

A frame having an input speech power higher than a predetermined value is determined to be a speech and, the most significant packet during this interval of time is assigned high priority while the least significant packet is assigned low priority. The number of bits with which one sample of the input speech is encoded is determined by the prediction gain of that frame or the ratio in mean square value of the input speech signal to mean square value of the differential signal. If the prediction gain is higher than a predetermined threshold, the speech signal is encoded with six bits in all; namely, with the most significant three bits and the least significant three bits. At this time, adaptation of the prediction coefficient is performed in a first coding mode, represented by "0", using only the most significant three-bit differential code. If the prediction gain is less than the predetermined threshold, the speech signal is encoded with four bits in all; namely, with the most significant two bits and the least significant two bits. At this time, adaptation of the prediction coefficient is performed in a second coding mode, represented by "1", using the most significant 2-bit differential code.

A frame in which the power of the input speech is less than the predetermined value is determined to be silence. The speech signal is encoded with the most significant two bits and only the most significant packet is transmitted. At this time, the most significant packet of a frame in which the prediction gain is higher than a predetermined value is assigned high priority while the most significant packet of a frame in which the prediction gain is less than the predetermined value is assigned low priority. Adaption of the prediction coefficient is made in the second coding mode.

FIG. 2 shows how the input speech signal is converted to a differential coding and is output. A differential code of 6 or 4 bits is output at each sample period S. In the first coding mode, the most significant packet is made of the most significant three bits ($b_{11}$, $b_{12}$, $b_{13}$ . . . , $bN_{11}$, $bN_{12}$, $bN_{13}$) of $N_1$ samples (in a frame of $F_1$ seconds). The least significant packet is made of the least significant three bits ($b_{14}$, $b_{15}$, $b_{16}$ . . . $bN_{14}$, $bN_{15}$, $bN_{16}$). In the second coding mode, the most significant packet is made of the most significant two bits ($b_{11}$, $b_{12}$, $b_{21}$, . . . $bN_{21}$, $bN_{22}$) of $N_2$ samples (in a frame of $F_2$ seconds), and the least significant packet is made of the least significant two bits ($b_{13}$, $b_{14}$, $b_{23}$, . . . , $bN_{23}$, $bN_{24}$) of the $N_2$ samples.

FIGS. 3A through 3D each show the structure of a packet. FIGS. 3A and 3B illustrate the structures of the most and least significant packets, respectively, taken when the coding mode is the first coding mode. FIGS. 3C and 3D illustrate the most and least significant packets, respectively, taken when the coding mode is the second coding mode.

Each packet includes logical channel number 30 indicative of transit nodes through which the packet passes to a destination receiver, sequence number 31 which is a serial number given in the order of generation of each packet, most-/least-significant packet indication bit 32 indicative of the kind (most/least significance) of a differential code contained in the packet, bit 33 indicative of the priority of packet transmission bit, 34 indicative of a coding mode in which coding is made, and bit 35 indicative of a speech data field.

Figure 4A:
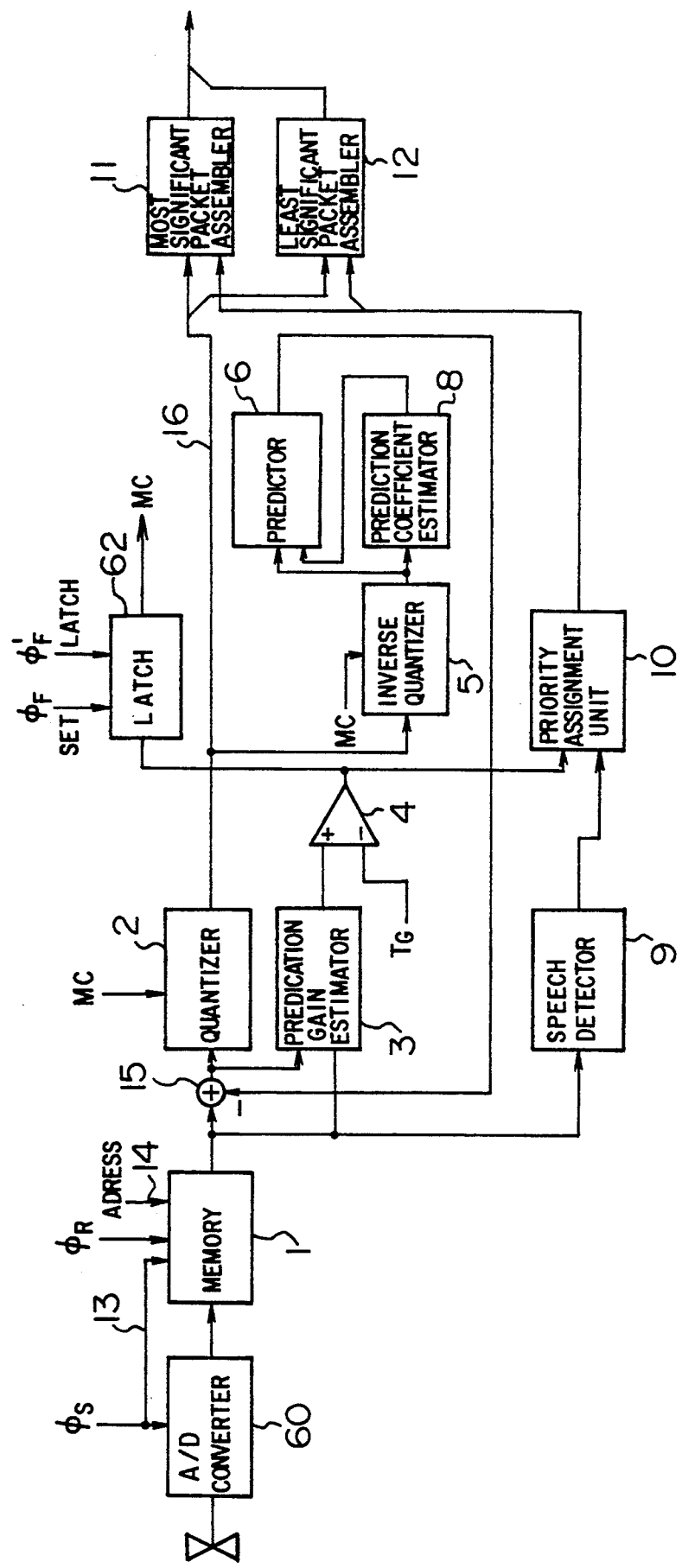
FIGS. 4A and 4B are block diagrams of the transmitter and receiver, respectively, of the speech transmission apparatus to which the present invention is applied.
Figure 4B:
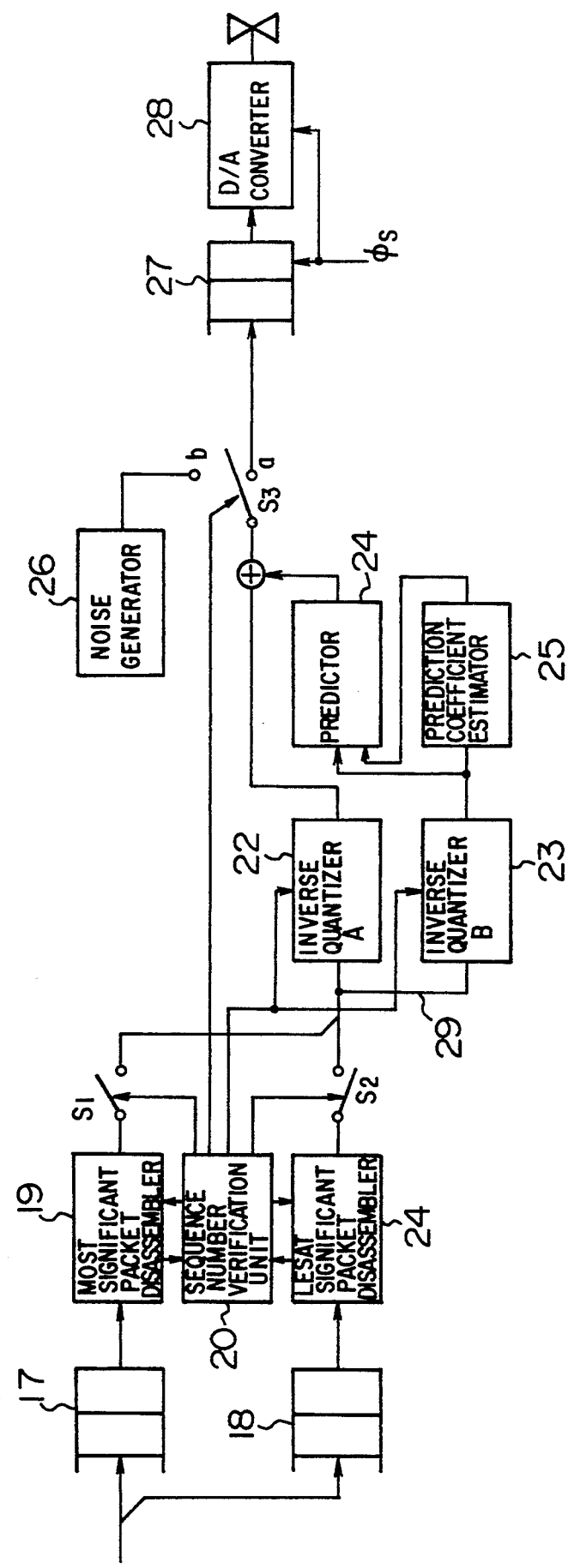

FIGS. 4A and 4B are a block diagram of a transmitter and a receiver, respectively, of the speech communication system according to the present invention. The transmitter converts a speech signal inputted at a predetermined sample period S to a digital signal through A/D converter 60 and temporarily stores the resulting signal in memory 1 at predetermined frame period F.

The speech signals stored in memory 1 are sequentially read out with control signals 13 and 14, and converted to differential codes by a subtracter 15 and a quantizer 2.

The subtracter 15 calculates the difference between the input speech signal and the prediction signal output from a predictor 6 and outputs a differential signal indicative of the difference. The differential signal is converted in a quantizer 2 to a differential code of a predetermined number of bits prescribed by a control signal MC and output via a signal line 16 to packet assemblers 11 and 12. The most significant bits of the differential code are output to the most significant packet assembler 11 while the least significant bits are output to the least significant packet assembler 12 to thereby form the most and least significant packets, respectively.

The differential code is also input to an inverse quantizer 5 which restores the differential signal. A predictor 6 calculates a prediction signal using the differential signal and a prediction coefficient to be described later in more detail. The accuracy of the differential signal output from the inverse quantizer 5 is also designated by a control signal (MC), as in the quantizer 2. The differential signal is quantized, for example, with 6 bits, by the quantizer 2 at the head of a frame at MC=1 in the first mode to provide a differential code, and the inverse quantizer 5 restores the differential signal from this differential code. A prediction coefficient estimator 8 calculates a prediction coefficient input to the predictor 6 from the differential signal. The structure of the predictor 6 and a process for calculating the prediction coefficient are described in detail, for example, in Proc. Globecom' 84 (1984) pp. 23.1.1.–23.1.4, which is hereby incorporated by reference, and further description thereof will be omitted.

FIG. 5 is a block diagram of the structure of a prediction gain estimator 3. The speech signal inputted at sample period S and the differential signal are squared by a multiplier 51, and integrated by an integrator 52 to provide an integrated square value at frame period F. A divider 53 calculates a prediction gain which includes the ratio of the mean square value of the speech signal to the mean square value of the differential signal. After the prediction gain is calculated, the integrator 52 is reset with a clock signal $\phi_F$ having a period of one frame. The indication $\phi_S$ denotes a sampling clock.

A comparator 4 compares the prediction gain with a predetermined threshold $T_G$. If the gain is higher than threshold $T_G$, the comparator 4 outputs "1" indicative of the first coding mode while if the gain is lower than threshold $T_G$, the comparator outputs "0" indicative of the second coding mode.

The output of the comparator 4 is delivered to a latch 62 where the output signal is set with clock $\phi_F$ at the head of a frame. The prediction gain of the frame is compared with threshold $T_G$ and the result of the comparison is latched by latch 62 in synchronism with a clock $\phi'_F$ which is delayed a fixed time from the clock $\phi_F$, to be the control signal MC for the frame.

FIG. 6A illustrates the structure of quantizer 2 (FIG. 4A) which includes a ROM which receives the control signal MC and the differential code as address inputs.

FIG. 6B illustrates a table indicative of a characteristic of quantizer 2. For simplicity, here, an example will be described in which a 2-bit differential code, for example, is output. If control signal MC=0, the quantizer 2 outputs a 2-level differential code while if the control signal MC=1, the quantizer outputs a 4-level differential code.

More specifically, when MC=0, the quantizer 2 outputs "1" as the differential code value for all the numerical values ranging from 0 to $+\infty$ of the differential signal and outputs "−2" as the differential code value for all the numerical values ranging from $-\infty$ to 0 of the differential signal. When MC=1, the quantizer 2 outputs differential code values 1, 0, −1, and −2 for all the numerical values in the respective ranges of the differential signal 4 to $+\infty$, 0 to 4, −3 to 0 and $-\infty$ to −3, respectively, of the differential signal.

FIG. 6C shows the structure of the inverse quantizer 5 (FIG. 4A) which includes a ROM which receives the control signal MC and a differential code as address inputs.

FIG. 6D illustrates a table indicative of a characteristic of the inverse quantizer 5. For simplicity, an example will be described in which a 2-bit differential code is input. The inverse quantizer 5 outputs a 2-level decoded differential signal when the control signal MC=0, and a 4-level decoded differential signal when the control signal MC=1. More specifically, when MC=0, the inverse quantizer 5 outputs the decoded differential signal "10" for the differential code values "1" and "0" and outputs the decoded differential signal value "−10" for the differential code values "−1" and "−2". When MC=1, the dequantizer 5 outputs the decoded differential signal values "10" "2" "−2" and "−10" for the differential code values "1" "0" "−1" and "−2", respectively.

Referring again to FIG. 4A, the prediction gain is calculated when encoding of the input speech signal is effected with MC=1. If the prediction gain exceeds a threshold, the input speech signal is determined as a voiced sound and the output of comparator 4 the (the output is hereinafter referred to as a prediction gain flag) is "1" (the coding mode is "0"). If the prediction gain does not exceed the threshold, the prediction gain flag is "0" (the coding mode is "1"), so that MC is set to 0. Namely, the accuracies of the quantizer and inverse quantizer are reduced and encoding is effected again from the head of a frame to thereby output a differential code again.

The most- and least-significant packet assemblers 11 and 12 are controlled with a clock synchronous with control signal MC. If the prediction gain has not exceed the threshold, the signal encoded with MC=1 is discarded and the speech signal reencoded with MC=0 is transmitted.

The prediction gain flag is also delivered to priority assignment unit 10, the structure of which is shown in FIG. 7A. The priority assignment unit 10 includes a table ROM which receives as its address inputs the prediction gain flag and the output of speech detector 9 (speech/silence flag) to determine whether the input speech signal for one frame contains a speech signal. The priority assignment unit 10 provides the priorities of the most and least significant packets. FIG. 7B illustrates a table indicative of a characteristic of the priority assignment unit 10. The priority "0" indicates high priority while the priority "1" low priority, and "−" indicates that no packets are transmitted. In the speech/silence flag, "0" represents silence and "1" speech. In the prediction gain flag, "1" represents a voiced sound and "0" a non-voiced sound. As will be obvious from the table of FIG. 7B, when speech/silence flag is "1", the most and least significant packets are assigned high and low priorities, respectively, irrespective of the prediction gain flag being "0" or "1". When the speech/silence flag is "0", and the prediction gain flag is "0", the most significant packet is assigned low priority and the least significant packet is not transmitted. When the prediction gain flag is "1", the most significant packet is assigned high priority and the least significant packet is not transmitted.

The priority assignment unit 10 sets the coding mode indication bits 34 of the most and least significant bits to "1" or "0" in accordance with the prediction gain flag.

Packets of FIGS. 3A–3D are prepared from the differential codes and priorities, thus obtained, and output to the receiver.

FIG. 4B is a block daigram of the receiver. The received most and least significant packets are stored in most- and least-significant packet buffers 17 and 18, respectively. Packets are delivered one by one to packet disassemblers 19 and 21 from the packet buffers 17 and 18, respectively. In packet disassemblers 19 and 21, logical channel number 30, most-/least-significant indication bit 32 and priority indication bit 33, which are not required to be decoded, are first extracted and discarded. Sequence number 31 is then extracted and a sequence number verification unit 20 checks whether the sequence numbers of the most and least significant packets are in serial order or not. If the numbers are in serial order both in the most and least significant packets, switches $S_1$ and $S_2$ are closed and $S_3$ is switched to side a. As a result, differential codes for one packet are read out from the most- and least-significant packet disassemblers 19 and 21 and delivered to inverse quantizers A22 and B23, respectively. The accuracy of the inverse quantizers A22 and B23 is designated with a bit 34 indicative of a coding mode extracted from the received packet. The characteristics of the inverse quantizer B23 are the same as those of the inverse quantizer 5 of the transmitter. The inverse quantizer A22 has twice the accuracy of the inverse quantizer B23. For example, in the first mode, the inverse quantizer A22 has a 6-bit accuracy and the inverse quantizer B23 a 3-bit accuracy. In the second mode, the inverse quantizer A22 has a 4-bit accuracy and the inverse quantizer B23 a 2-bit accuracy.

The output of the inverse quantizer B23 is delivered to a prediction coefficient estimator 25 which outputs a prediction coefficient. The output of the inverse quantizer B23 is delivered together with the prediction coefficient to a predictor 24 which calculates a prediction signal. The predictor 24 and the prediction coefficient estimator 25 have the same characteristics as the predictor 6 and the prediction coefficient estimator 8 of the transmitter.

The prediction signal is then added to the output of the inverse quantizer A22 to decode the speech signal and the resulting speech signal is stored in a decoded speech buffer 27, from which decoded speech signals are read out sample by sample in accordance with a sample clock $\phi_s$ subjected to D/A conversion and delivered to a handset.

If there is a missing number only in the sequence numbers 31 of the least significant packet, switch $S_2$ is opened, $S_1$ is closed and $S_3$ is switched to side a. As a result, the speech signal is demodulated using only the differential codes of the most significant packet.

If there are missing numbers in the most significant packets or both in the most and least significant packets, switches $S_1$, $S_2$ are together open and $S_3$ is switched to side b. At this time, the decoder does not work and, instead, a noise generator 26 outputs a packet of noise simulating the speech signal.

According to the embodiment, if the calculation of the prediction coefficient is effected using a differential signal with a predetermined accuracy to greatly reduce the prediction gain, so that a deterioration in the speech quality is determined to be high, the prediction coefficient estimation is effected using a high accuracy differential signal to enhance the prediction gain and the differential code is expressed with high accuracy to reduce the quantization noise to thereby prevent a deterioration in the speech quality due to embedded encoding. At this time, a deterioration in the speech quality due to discarding is also suppressed. The reason for this is as follows. Since, generally, a voice of a large prediction gain corresponds to a speech or a vowel, an increase in the quantization noise due to discarding the least significant packet is very large compared to that obtained when silence or the least significant speech packet corresponding to a consonant is discarded. This is because a non-voiced speech signal contains noise components similar to quantization noise. By increasing the prediction accuracy of the voiced sound portion, a level of noise actually heard by human ear is greatly reduced.

A second embodiment will now be described in which the level value of the speech differential signal or the mean square value of the differential signal is used as a criterion for determining the prediction coefficient adaptation mode. The embodiment is realized by replacing the prediction gain estimator 3 (FIG. 4A) of the first embodiment with a differential signal mean square estimator 63 shown in FIG. 8. In this case, only the differential signal is required as the input signal, and the speech signal is not required.

The operation of the differential signal mean square estimator will now be described. The differential signal input at predetermined sample periods S is squared by a multiplier 51 and the resulting signal is integrated by an integrator 52 at frame periods of F seconds. The resulting integrated mean square value is delivered to the comparator 4 and the integrator 52 is then reset with a clock signal $\phi_F$ having a frame period.

If the mean square value of the differential signal, thus obtained, exceeds a predetermined threshold, it is determined that the difference between the prediction value and the input speech is large, setting the coding mode indication bit 34 (FIGS. 3A-3D) to "1". If the mean square value of the differential signal does not exceeds the threshold, it is determined that the prediction value matches satisfactorily with the input speech, and that coding mode indication bit 34 is set to "1". Thus, like the first embodiment, the speech signal is encoded and a packet is prepared and transmitted.

According to the embodiment, deterioration in the speech quality due to Embedded Encoding is suppressed and a deterioration in the speech quality due to discarding is also suppressed as in the first embodiment. The computational complexity of the determination process of the prediction adaptation mode is reduced compared to the first embodiment.

While in the above embodiments only the arrangements have been described in which the input speech signal is divided into two; the most and least significant bits in encoding, division of the encoded speech signal is not restricted to two, and the encoded speech signal may be divided into any number of pieces.

FIGS. 9A and 9B illustrate a third embodiment which has substantially the same structure as the first embodiment of FIG. 4A. By employing the structure of FIGS. 9A and 9B, a process for supplying a threshold used for determination of the prediction coefficient adaptation mode is effected.

In FIG. 9A, a dial pulse/tone signal from a telephone is input to call a sequence detector 43. A plurality of call sequences determined beforehand in call setting is detected and the result of the detection is delivered to a threshold ROM 42, which supplies to the comparator 4 a prediction gain threshold varying depending on the detected number of the call sequence. FIG. 9B illustrates an illustrative characteristic in which as the detected number of the call sequence is smaller, the threshold is smaller. As the threshold becomes smaller, the coding mode of even a frame in which the prediction gain is low is likely to be "1", and, as a result, the tone quality is improved. It is to be noted, however, that the number of high priority packets increases accordingly. On the other hand, as the threshold becomes higher, the coding mode of even a frame in which the prediction gain is higher is likely to be "0", and as a result the tone quality is deteriorated, but the number of high priority packets also decreases accordingly. Generally, since a transmission delay and a discard rate are not ensured unless the number of high priority packets is limited below a predetermined value, the system is constructed such that the number of occurrence of high priority packets is a minimum required value in system design, and a high call charge is made for the transmission of high priority packets as compared to the transmission of low priority packets. Thus, according to the embodiment, by inputting a specified call sequence depending on application, an economical communication whose quality is more or less sacrificed can be selected, for example, in intraoffice communication, while high quality communication can be selected for communication with external customers. While in the embodiment a specified call sequence is illustrated, a subscriber number which provides high quality speech communication may be discriminated from a subscriber number which provides economical speech communication by changing the threshold according to subscriber number. While the present embodiment is illustrated as being applied to the first embodiment, it may be applied to the second embodiment. As will be obvious from the above description, according to the present invention, high reproduced speech quality is obtained at the receiving end even if the communication circuit between terminals is in high traffic state.

According to the present invention, in converting a speech signal in a particular interval to a differential code, when a prediction coefficient is applied to an input speech signal by using only differential codes of a predetermined accuracy with a result of high deterioration, a prediction coefficient adapted with a high accuracy differential code can be used, or the speech signal can be encoded using a high accuracy quantization characteristic so as to convert the speech signal to a differential code with reduced deterioration in the tone quality. For example, when a frame the prediction gain of which was 5 dB or more was encoded by using a prediction coefficient adapted with a high accuracy differential code and a high accuracy quantization differential signal, a signal to noise ratio was improved by 4 dB or more compared to the conventional system. In addition, the mean opinion score was improved by about 0.2 point or more.

At this time, a deterioration in the speech quality is prevented even if discarding of a speech packet occurs during transmission. For example, if encoding was effected with 5 dB prediction gain threshold and the resulting packet was transmitted according to the above embodiments, the signal to noise ratio was improved by about 4 dB and the mean opinion score was improved by one point more when low priority packets were discarded by 30%.

Further, a criterion for determining a prediction coefficient adaptation process may be changed by using a specified call sequence input to discriminate between high quality speech communication and economical speech communication, according to application.

We claim:

1. A speech packet communication system in which two terminals communicate speech signal packets through transmission line means, each said terminal means comprising:

means for generating a differential speech signal indicative of the difference between an input speech signal inputted at a predetermined sample period and its prediction signal;

encoding means for converting the differential speech signal to a differential coded speech signal of a plurality of bits at each predetermined sample period, the number of bits of the differential coded speech signal varying depending on the nature or property of the speech signal input during a frame period comprising a plurality of sample period durations;.

packet assembling means for preparing a packet from the plurality of differential coded speech signal obtained in the frame period and delivering the packet to said transmission line means:

means for calculating a prediction coefficient from the differential coded speech signal, the number of differential coded bits used for adaptation of the prediction coefficient varying depending on the nature or property of the input speech signal;

means connected to said prediction coefficient calculating means for generating the prediction signal; and first detection means for detecting the nature or property of the input speech signal inputted in the frame period from one of the input speech signal and the differential speech signal;

wherein said first detection means comprises second detection means for detecting a prediction gain of the frame period of the differential speech signal and comparing the detected prediction gain with a predetermined threshold:

wherein the number of differential coded bits of said encoding means and the number of differential encoded bits used for adaptation of the prediction coefficient are determined depending on the result of the detection by said second detection means;

wherein when the detected prediction gain is equal to, or higher than, the predetermined threshold, the number of differential encoded bits of the encoding means and the number of differential encoded bits used for adaptation of the prediction coefficient are relatively large, and wherein when the detected prediction gain is smaller than the predetermined threshold, the number of differential encoded bits of the encoding means and the number of differential encoded bits used for adaptation of the prediction coefficient are relatively small.

2. A speech packet communication system in which two terminals communicate speech signal packets through transmission line means, each said terminal means comprising:

means for generating a differential speech signal indicative of the difference between an input speech signal inputted at a predetermined sample period and its prediction signal:

encoding means for converting the differential speech signal to a differential coded speech signal of a plurality of bits at each predetermined sample period, the number of bits of the differential coded speech signal varying depending on the nature or property of the speech signal input during a frame period comprising a plurality of sample period durations;

packet assembling means for preparing a packet from the plurality of differential coded speech signal obtained in the frame period and delivering the packet to said transmission line means;

means for calculating a prediction coefficient from the differential coded speech signal, the number of differential coded bits used for adaptation of the prediction coefficient varying depending on the nature or property of the input speech signal;

means connected to said prediction coefficient calculating means for generating the prediction signal; and first detection means for detecting the nature or property of the input speech signal inputted in the frame period from one of the input speech signal and the differential speech signal;

wherein said packet assembling means comprises a first packet assembler for preparing a first packet of the respective most significant bits of a plurality of differential coded speech signals obtained during the frame period and a second packet assembler for preparing a second packet of the respective least significant bits of the plurality of differential encoded speech signals obtained during the frame period;

wherein each terminal means comprises priority assignment means for determining first and second priority indicators indicative of the priorities of transmission of the first and second packets to be incorporated into the first and second packets in accordance with the result of detection of said first detection means:

wherein said first detection means comprises second detection means for generating a parameter indicating whether the speech signal input during the frame period represents a speech or silence, and wherein when the parameter represents a speech, the first priority is assigned to the first packet and the second priority is assigned to the second packet while when the parameter represents silence, the first priority is assigned to the first packet and the second packet is refrained from transmission.

3. A speech packet communication system according to claim 2, wherein said first detection means further comprises third detection means for detecting a prediction gain of the frame period of the differential speech signal and comparing the detected prediction gain with a predetermined reference value; and wherein the number of differential coded bits of said encoding means and the number of differential encoded bits used for adaptation of the prediction coefficient are determined depending on the result of the detection by said third detection means.

4. A speech packet communication system according to claim 3, wherein when the detected prediction gain is equal to, or higher than, the predetermined threshold, the number of differential encoded bits of the encoding means and the number of differential encoded bits used for adaptation of the prediction coefficient are relatively large, and wherein when the detected prediction gain is smaller than the predetermined threshold, the number of differential encoded bits of the encoding means and the number of differential encoded bits used for adaptation of the prediction coefficient are relatively small.

5. A speech packet communication system according to claim 2, wherein said first detection further means comprises third detection means for detecting a mean level of the frame period of the differential speech signal as a prediction gain and comparing said detected prediction gain with a predetermined threshold; and wherein the number of differential coded bits of said encoding means and the number of differential encoded bits used for adaptation of the prediction coefficient are determined depending on the result of the detection by said third detection means.

6. A speech packet communication system in which two terminals communicate speech signal packets through transmission line means, each said terminal means comprising:

means for generating a differential speech signal indicative of the difference between an input speech signal inputted at a predetermined sample period and its prediction signal;

encoding means for converting the differential speech signal to a differential coded speech signal of a plurality of bits at each predetermined sample period, the number of bits of the differential coded speech signal varying depending on the nature or property of the speech signal input during a frame period comprising a plurality of sample period durations;

packet assembling means for preparing a packet from the plurality of differential coded speech signal obtained in the frame period and delivering the packet to said transmission line means;

means for calculating a prediction coefficient from the differential coded speech signal, the number of differential coded bits used for adaptation of the prediction coefficient varying depending on the nature or property of the input speech signal;

means connected to said prediction coefficient calculating means for generating the prediction signal: and first detection means for detecting the nature or property of the input speech signal inputted in the frame period from one of the input speech signal and the differential speech signal;

wherein the differential encoded speech signal output during the frame period comprises at least six bits.

7. A speech packet communication system in which two terminals communicate speech signal packets through transmission line means, each said terminal means comprising:

means for generating a differential speech signal indicative of the difference between an input speech signal inputted at a predetermined sample period and its prediction signal;

encoding means for converting the differential speech signal to a differential coded speech signal of a plurality of bits at each predetermined sample period, the number of bits of the differential coded speech signal varying depending on the nature or property of the speech signal input during a frame period comprising a plurality of sample period durations;

packet assembling means for preparing a packet from the plurality of differential coded speech signal obtained in the frame period and delivering the packet to said transmission line means;

means for calculating a prediction coefficient from the differential coded speech signal, the number of differential coded bits used for adaptation of the prediction coefficient varying depending on the nature or properly of the input speech signal;

means connected to said prediction coefficient calculating means for generating the prediction signal; and first detection means for detecting the nature or property of the input speech signal inputted in the frame period from one of the input speech signal and the differential speech signal;

wherein the number of differential encoded bits used for adaptation of the prediction coefficient in the frame period comprises at least three bits.

8. A speech packet communication system in which two terminals communicate speech signal packets through transmission line means, each said terminal means comprising:

means for generating a differential speech signal indicative of the difference between an input speech signal inputted at a predetermined sample period and its prediction signal;

encoding means for converting the differential speech signal to a differential coded speech signal of a plurality of bits at each predetermined sample period, the number of bits of the differential coded speech signal varying depending on the nature or property of the speech signal input during a frame period comprising a plurality of sample period durations;

packet assembling means for preparing a packet from the plurality of differential coded speech signal obtained in the frame period and delivering the packet to said transmission line means;

means for calculating a prediction coefficient from the differential coded speech signal, the number of differential coded bits used for adaptation of the prediction coefficient varying depending on the nature or property of the input speech signal;

means connected to said prediction coefficient calculating means for generating the prediction signal;

first detection means for detecting the nature or property of the input speech signal inputted in the frame period from one of the input speech signal and the differential speech signal;

wherein said first detection means comprises second detection means for detecting a prediction gain of the frame period of the differential speech signal and comparing the detected prediction gain with a predetermined threshold;

wherein the number of differential coded bits of said encoding means and the number of differential encoded bits used for adaptation of the prediction coefficient are determined depending on the result of the detection by said second detection means; and means for changing the predetermined threshold value for the prediction signal in accordance with the speech quality required by the user.

* * * * *